United States Patent
Harben, Jr.

[15] 3,685,096
[45] Aug. 22, 1972

[54] APPARATUS FOR EVISCERATING CHICKENS OR OTHER FOWL

[72] Inventor: Grover S. Harben, Jr., Gainesville, Ga.

[73] Assignee: Gainesville Machine Company, Inc., Gainesville, Ga.

[22] Filed: Dec. 8, 1969

[21] Appl. No.: 883,169

[52] U.S. Cl. ........................................17/11, 17/45
[51] Int. Cl. ........................................A22c 21/06
[58] Field of Search .............................17/11, 45

[56] References Cited

UNITED STATES PATENTS 3,555,593   1/1971   Scheier ..................17/11 X

*Primary Examiner*—Lucie H. Laudenslager
*Attorney*—Newton, Hopkins and Ormsby

[57] ABSTRACT

Method and Apparatus for removing the viscera from chickens or other fowl being conveyed in a head lowermost suspended state along a predetermined path. The method includes cutting the gullet of the fowl between its crop and head, removing the viscera while leaving the crop within the fowl to display the viscera for inspection, and subsequently removing the crop by pulling on the viscera. The apparatus includes a special shackle for suspending the bird by its hocks with a sterilized spoon-shaped viscera removal tool adapted to be received in a precut hole in the abdomen of the bird. The shackle and tool are displaced vertically with respect to each other to introduce the tool into the bird and remove the viscera therefrom. Devices are provided in the path of travel for maintaining a proper orientation of the bird to permit removal of all of the viscera by the spoonshaped tool.

8 Claims, 12 Drawing Figures

3,685,096

APPARATUS FOR EVISCERATING CHICKENS OR OTHER FOWL

BACKGROUND OF THE INVENTION

The present invention relates generally to the processing of poultry and more particularly to a method and apparatus for automatically removing the viscera from chickens or other fowl and exposing the viscera for inspection.

Commercial practicability dictates that as much of the edible portion by weight as possible be retained with the chicken or other fowl during the killing and preparation thereof for delivery to the marketing place. In the processing of chickens or other fowl into ready-to-cook form, such preparation includes killing the bird by cutting his jugular vein, scalding and defeathering the bird, and then skillfully and carefully removing the viscera from the bird in such a manner as to avoid contaminating the carcass and to prevent mutilation and loss of edible parts. Moreover, under Federal laws regulating all poultry and poultry products entering into interstate commerce, the viscera of each bird must retain their identity with the bird from which they are drawn until they have been examined by a Federal inspector to insure that all such birds proceeding therefrom are free of disease. The most common method of complying with this requirement is to let the viscera hang outside the body cavity, attached to the carcass. Thus, the viscera are completely drawn and left suspended from the same side of each bird in full view of an inspector as the bird is conveyed by an inspection station in such a manner that also makes the giblets more accessible and within easy reach of a giblet trimmer for removing the giblets from a bird subsequent to the inspection thereof.

Heretofore the evisceration has been performed manually by supporting the bird with one hand and inserting the fingers of the other hand through an incision in the abdomen thereof, thence loosely gripping and, with a gentle twisting motion, slipping the viscera out of the body. In addition to being a slow operation, the heart of the bird is often missed when the viscera is withdrawn by hand by the method indicated. The gullet and crop is another organ that is generally not removed by the manual viscera removal operation due primarily to the fact that the gullet in most cases is not detached during the killing of the bird. Another drawback of the hand removal of the viscera is that the flank meat of the bird is often torn, thereby downgrading the the quality of the bird. Also, whenever a diseased bird is detected by the inspector, it becomes necessary to remove not only the diseased bird from the conveyor, but all the birds subsequently touched by the person having removed the diseased viscera by hand which possibly may have been infected as a result of such subsequent contact. A delay is thus encountered at the inspection station while the possibly contaminated birds are removed and the hands of the operator are washed or the gloves thereof either changed or cleaned. This delay backs up the entire processing operation and is thus costly to the processor both in terms of time lost and production.

SUMMARY OF THE INVENTION

Accordingly, it is an object of the present invention to provide a method of withdrawing and exposing for inspection the viscera of chickens or other fowl.

Another object of the present invention is to provide a method of removing and exposing the viscera of a plurality of chickens or other fowl in succession wherein the communication of disease between such chickens or other fowl is averted.

Still another object of this invention is to provide a method of removing and exposing the viscera of a chicken or fowl.

Yet another object of this invention is to provide a method of automatically removing and exposing for inspection the viscera of a chicken or other fowl.

A further object of this invention is to provide an apparatus for automatically removing the viscera from a chicken or other fowl and exposing the viscera for inspection.

Another object of the invention is to provide a method of removing the viscera including the crop through the precut hole in the abdomen of the fowl.

A still further object of this invention is to provide an apparatus for automatically removing the viscera from a plurality of chickens or other fowl being conveyed along a predetermined path and for exposing the viscera for inspection in which the disease of any one chicken or other fowl is not communicated to another chicken or other fowl subsequently conveyed along the predetermined path.

The foregoing and other objects are attained by the use of a shackle member having an elongated spoon-like viscera removal tool secured thereon and movable relative thereto along an axis coincidental with the longitudinal axis of the tool. The chicken or other fowl is suspended head lowermost from the shackle and the shackle and the bird are moved along a predetermined path by a conveyor system. Engagement of the viscera removal tool with a pair of horizontally disposed bars lying along the line of travel of the conveyor prevents vertical movement of the tool as the shackle is conveyed along an upwardly inclined path, thereby drawing the shackle and the chicken suspended therefrom upward relative to the vertically-stationary tool. The tool is received in an opening in the abdomen of the bird as the bird is forcefully moved thereover, such that the tool passes down between the viscera and keel bone of the bird. Withdrawal of the viscera removal tool effectively takes place as the shackle is subsequently conveyed along a downwardly inclined path, whereby the shackle and the chicken are moved downwardly relative to the vertically-stationary tool and away therefrom as the bird is slowly pivoted upwardly away from the back of the spoon-configured tool such that the back of the bird is substantially horizontal when the bird completely disengages from the tool. This novel cooperation causes the lip of the spoon-like tool to be scraped along the inside of the back of the bird to forcefully remove the viscera as the bird separates from the tool. By cutting the neck of the bird so as to sever the gullet between the crop and head, this cut being generally made near the shoulder before the viscera is removed, the crop and that portion of the gullet attached thereto are subsequently removed through the precut hole in the abdomen of the bird as the viscera is discarded after inspection.

BRIEF DESCRIPTION OF THE DRAWINGS

Still other objects and many of the features and attendant advantages of the present invention will be readily appreciated by those skilled in the art as the same becomes better understood from the following detailed description when considered in connection with the accompanying drawings wherein like reference numerals designate like or corresponding parts throughout the several views, and in which.

DESCRIPTION OF ILLUSTRATIVE EMBODIMENT

Figure 1:
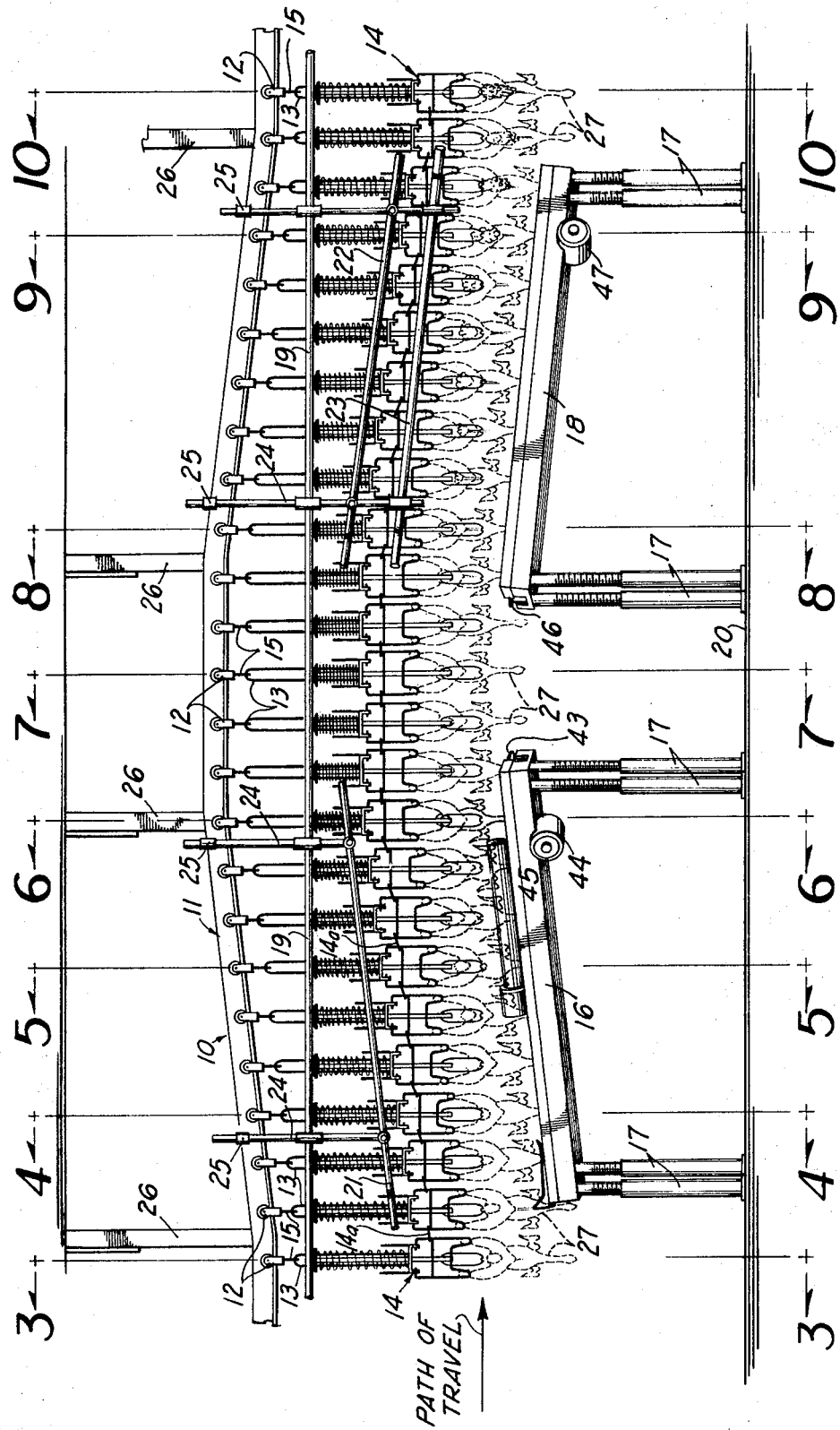
FIG. 1 is an elevational view of a complete eviscerating system constructed in accordance with the teachings of the present invention and showing a plurality of chickens or other fowl disposed in the various stages of the evisceration process.

Referring now to FIG. 1, there is shown an eviscerating system comprising a conveyor device indicated generally by the reference numeral 10 and including a substantially horizontally disposed channel or rail 11 defining a predetermined path of movement for a chicken or other fowl being conveyed thereby and having a plurality of wheels or rollers 12 movably positioned thereon, each of which is connected with a support 13 of a chicken or other fowl-bearing shackle member 14 by a chain link 15 for moving the shackle along the predetermined path of travel. The rollers 12 are moved by a conventional cable or chain conveyor (not shown) interconnecting them. The shackles 14, while being vertically oriented and positioned by the rail 11 and roller 12, may be held in horizontal displacement from each other by a connecting link 14a which is slidably mounted between adjacent shackles 14. The sliding connecting link maintains displacement between the shackles 14 while at the same time allows the shackles 14 to move vertically with respect to each other as they are moved along the rail 11. A first table 16 is disposed beneath the channel or rail 11 and is supported in an upwardly inclined attitude in the direction of travel of the shackle 14 by a plurality of floor jacks 17. A second table 18 similarly disposed beneath the channel 11 and spaced from the first table 16 is supported in a declining attitude in the direction of travel of the shackle 14 by another set of floor jacks 17.

The channel or rail 11 of the conveyor 10 follows a path that is first horizontal or level, then in sequence, inclining upwardly above the first table 16, level between the tables 16 and 18, declining above the second table 18, and finally level again. Thus, the inclined portion of the channel 11 is parallel to the surface of the table 16 and the declining portion of the channel 11 is parallel to the surface of the table 18. Disposed beneath the rail 11, but well above the tables 16 and 18, is a pair of parallel horizontal bars 19 which lie in a plane that is parallel to the floor or supporting foundation 20. Between one of the horizontal bars 19 and the table 16 there is positioned an elongated rod 21 of substantially the same length as the table 16 and disposed parallel to the surface of the table 16 and the rail 11. Between the second table 18 and the horizontal bars 19 thereabove, there are disposed a pair of parallel elongated rods 22 of substantially the same length as the table 18 and lying in a plane which is parallel to the conveyor rail 11 and the surface of the table 18. Further disposed between the rods 22 and the surface of the table 18 in parallel relationship therewith is another elongated rod 23 also of substantially the same length as the table 18. The horizontal bars 19 and the elongated rods 21, 22 and 23 are all suspended by a plurality of supports 24 secured to associated crossbraces 25 which are fixed to the rail 11 above the path thereon of the rollers 12. The rail 11, in turn, is suspended by major loading beams 26 from the ceiling.

Figure 2:
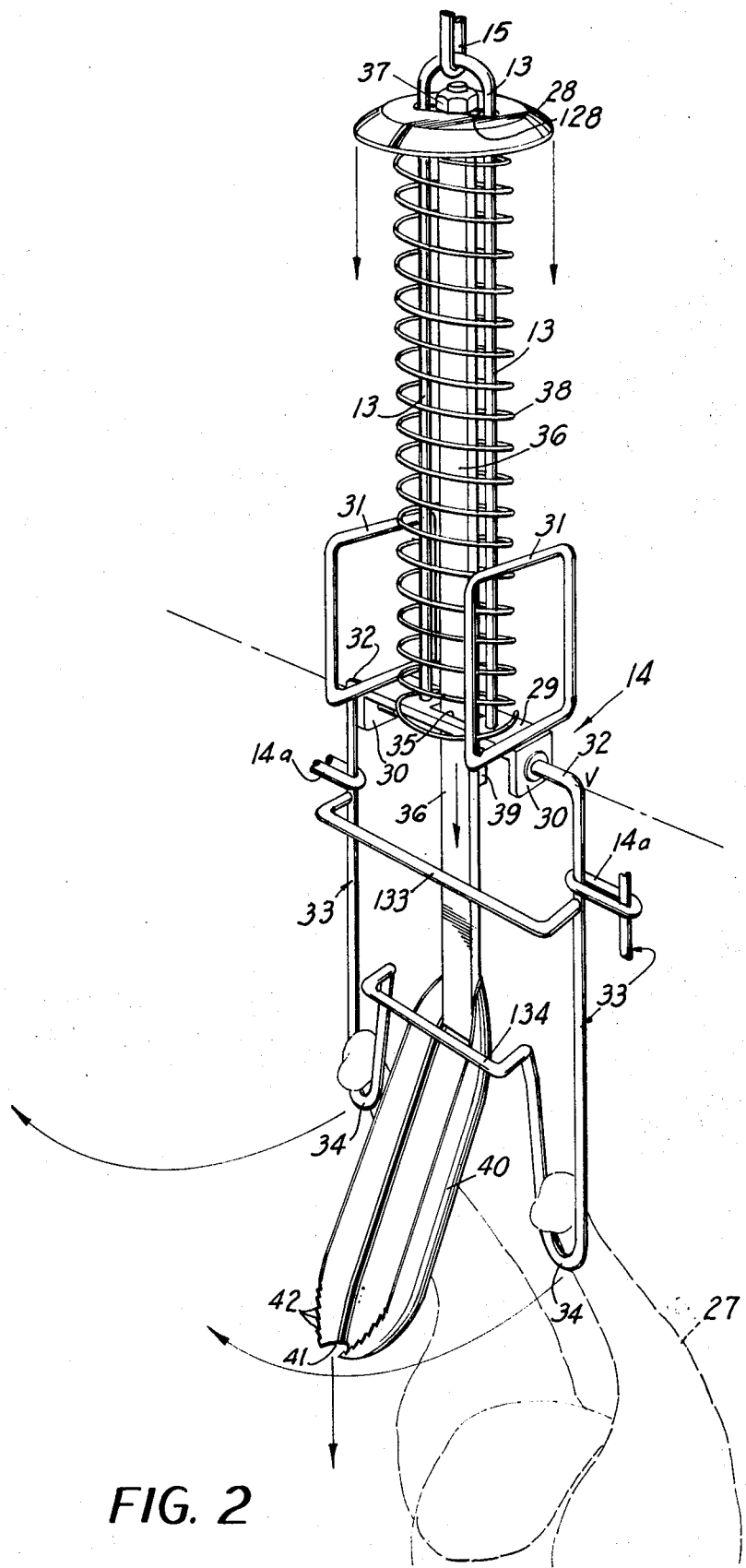
FIG. 2 is a perspective view of a shackle and eviscerating tool employed by the system shown in FIG. 1.

Turning now to FIG. 2, a chicken or other fowl 27 to be conveyed through the eviscerating system of the present invention is shown suspended by the hocks thereof from the shackle member 14. The shackle 14 comprises the elongated, generally inverted U-shaped support 13, the arms of which pass through a slot 128 in a disc-shaped camming member 28, a positioning spring 38 and terminate in the base portion of an inverted U-shaped bracket 30 as by welding or the like. A pair of substantially rod-like arms 31, shown herein formed into a square configuration, are secured to the edges of the outside surface of the base portion of the bracket 30 by welding or other suitable attachment means.

Pivotally disposed in apertures formed in the arms of the brace 30 are two inwardly-curved rod ends 32 of a bird supporting member 33. The support 33 includes a pair of U-shaped, hock clamping portions 34 which may be integrally formed with the rods 32. The inner ends of hock clamping portions 34 are joined by a cross member 134 as seen in FIG. 2 and is displaced forwardly of the plane of portions 34. Likewise, the spacing between the rod ends 32 is maintained by cross member 133 which is also displaced forwardly of the plane of the portions 34. The cross members 133 and 134 serve to strengthen support 33 and also limit the pivotal movement of the support 33 rearwardly as seen in FIG. 2 as will be explained hereinafter.

The bracket 30 is provided with an aperture 35 therethrough for slidably receiving an elongate arm 36, the threaded upper end of which extends through slot 128 in the camming member 28 to receive thereon a nut and fix the arm 36 with respect to camming member 28. The positioning coil spring 38 is disposed between camming member 28 and bracket 30 to constantly force them apart. A stop 39 secured to the arm 36 beneath the bracket 30 may be provided to limit the movement of the camming member 28 away from the bracket 30 under the biasing force of the spring 38 by contacting the undersurface of the base position of the bracket 30. It will also be noted that the cross members 133 and 134 will restrict rearward pivotal movement of support 33 as seen in FIG. 2 by engaging arm 36 and revoval tool 40.

At the other end of the elongate arm 36 there is securely attached as by welding or the like in somewhat angularly disposed relationship therewith, a substantially spoon-shaped viscera removal tool 40. In the normal generally uncompressed state of the spring 38, the removal tool 40 is positioned, as shown in FIG. 2, between the U-shaped, hock-clamping portions 34 of the shackle member 14. The forward end of the spoon-shaped viscera removal tool 40 is notched as indicated at 41 and is provided on either side of the notch with a serrated edge 42, the teeth of which are slanted rearwardly toward the elongated arm 36. The viscera removal tool 40 is provided with the serrate teeth 42 to sever or cleave the organs from their appendages within chicken or other fowl 27. The notch 41 fits over the backbone of the fowl 27 so that the organs will be removed from closely adjacent the backbone.

Figure 3:
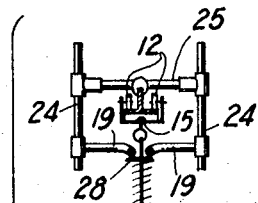
FIG. 3 is a transverse cross-sectional view, taken along the line 3—3 of FIG. 1 and showing a bird suspended from a shackle supported by a conveyor system ready for evisceration.
Figure 4:
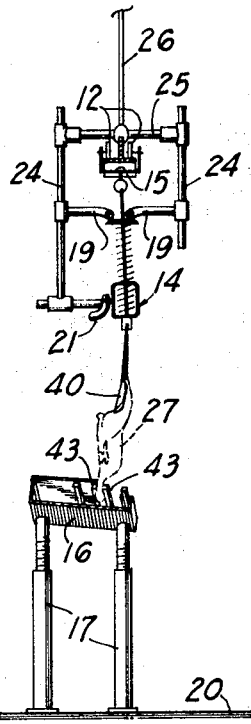
FIG. 4 is transverse cross-sectional view taken along the line 4—4 of FIG. 1 and showing the head of a bird disposed between a set of endless belts or chained on a first table having a line therebetween angularly oriented with respect to the path of travel of the bird on the illustrated conveyor system to direct the eviscerating tool into the bird.

Referring now to FIGS. 3 and 4, it may be seen that a chicken or other fowl 27 is suspended by its hocks from the shackle 14 and is being conveyed by rollers 12 to which the shackle 14 is secured through the shackle support 13 and the link 15. The upper surface of the camming member 28 at the upper end of the shackle 14 abuts and slides along the lower edges of the horizontally disposed bars 19.

Figure 5:
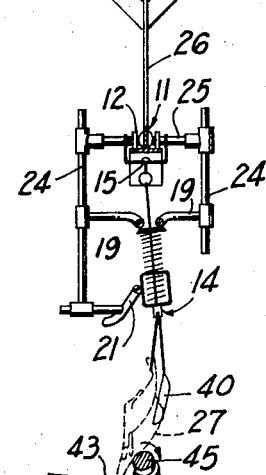
FIG. 5 is a transverse cross-sectional view, along the line 5—5 of FIG. 1 and showing a bird being drawn upward with an eviscerating tool partially inserted therein.
Figure 6:
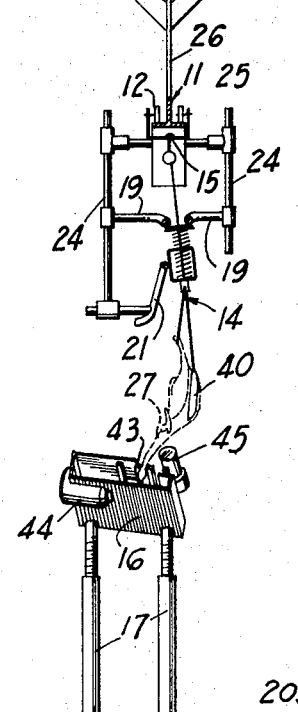
FIG. 6 is another transverse cross-sectional view, taken along the line 6—6 of FIG. 1 and showing a bird having an eviscerating tool fully inserted therein.
Figure 12:
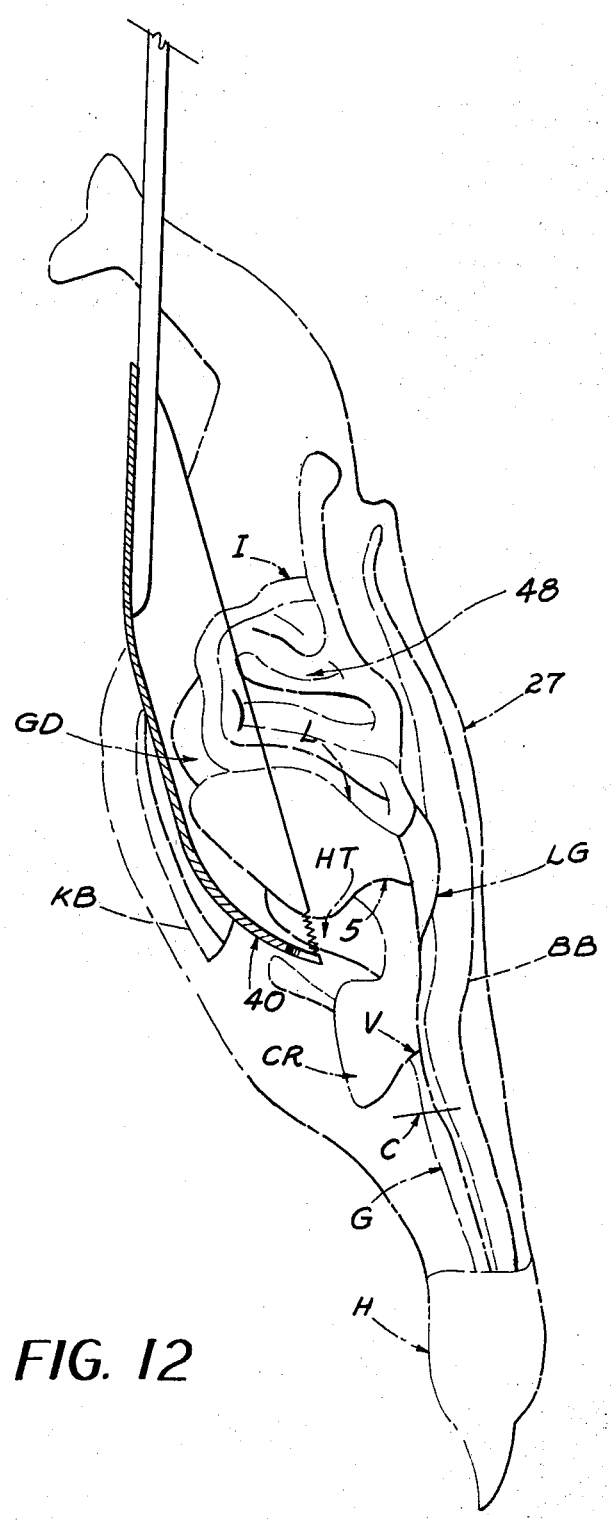
FIG. 12 is a view illustrating the viscera removal tool in position within a fowl, shown in phantom lines for removing the viscera therefrom.

As the rollers 12 enter the inclined portion of the path of travel, the head of the bird 27 is loosely gripped between parallel moving portions of a pair of endless belts or chains 43, disposed within the table 16 and driven by a motor 44 which moves the head of the bird in a line angularly oriented to one side of the path of travel of the bird, that is toward the viewers side as seen from FIG. 1. Simultaneously, the edges of the square-configured arms 31 of the shackle 14, on the side thereof facing the side toward which the head of the bird 27 is being moved, engage the elongated rod 21 which, in turn, is angularly oriented with respect to the path of travel of the bird, to the other side thereof. Thus, as the rollers 12 move up the inclined rail 11, drawing the bird-supporting shackle 14 vertically upward as it proceeds along the predetermined path of travel, the head of the bird 27 is moved to one side of the path and the hocks thereof are moved to the other side, thereby rotating the bird generally about the bracket 30 of the shackle 14 wherein rod ends 32 are pivotally disposed to orient it breast-downward. This rotation may be assisted by a motor-driven roller 45, shown in FIG. 5, against which the breast of the bird is urged upward forcing and aiding the insertion of the tool 40. As the shackle 14 is being drawn upward, the viscera removal tool is maintained vertically stable because movement of the member 28 to which it is secured is prevented by the horizontal bars 19. Relative movement, however, between the tool 40 and the shackle 14 causes the spoon portion of the tool to be inserted into a cavity precut in the abdomen of the bird 27 and, as a result of the pivotal movement of the bird, the spoon moves deeply into the bird between the viscera and the keel bone KB of the bird as shown in FIGS. 6 and 12 to a point just rearwardly of crop CR. Because the smooth edges of the serrations 42 face in the direction of movement, there is no impedimentary effect produced thereby.

Figure 7:
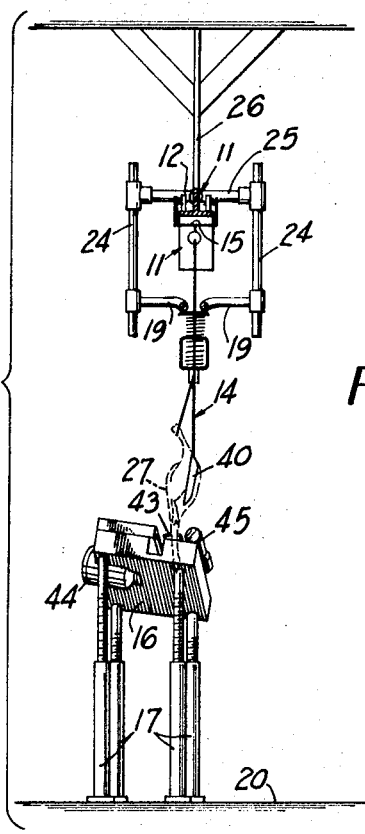
FIG. 7 is another transverse cross-sectional view, taken along the line 7—7 of FIG. 1 showing a bird with a fully inserted viscera removal tool disposed between the first table and a second table in the eviscerating area.
Figure 8:
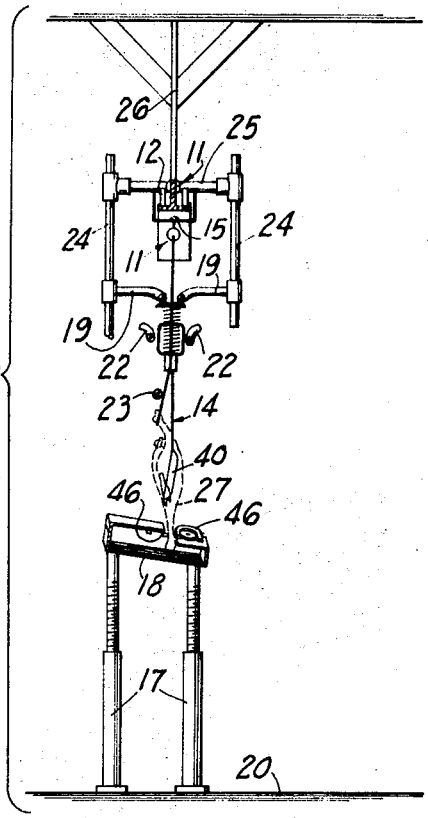
FIG. 8 is another transverse cross-sectional view taken along the line line 8—8 of FIG. 1 and showing the head of a bird disposed between a set of endless belts or chains on the second table having a line therebetween angularly oriented with respect to the path of travel of the bird on the illustrated conveyor system to direct the eviscerating tool out of the bird.

As may be seen in FIGS. 1 and 7, the bird hangs freely suspended by its hocks with the spoon-shaped tool 40 fully inserted as it moves along the level conveyor portion between the tables 16 and 18.

Figure 9:
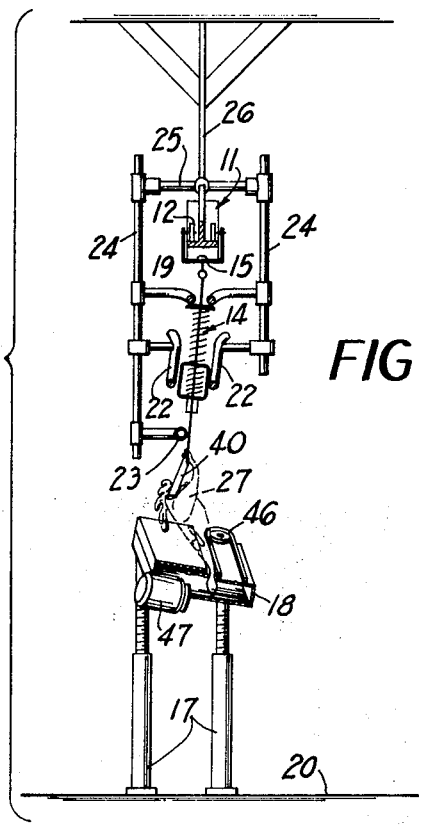
FIG. 9 is another transverse cross-sectional view, taken along the line 9—9 of FIG. 1 and showing a bird in a pivoted attitude and being moved vertically downward with respect to the eviscerating tool.
Figure 10:
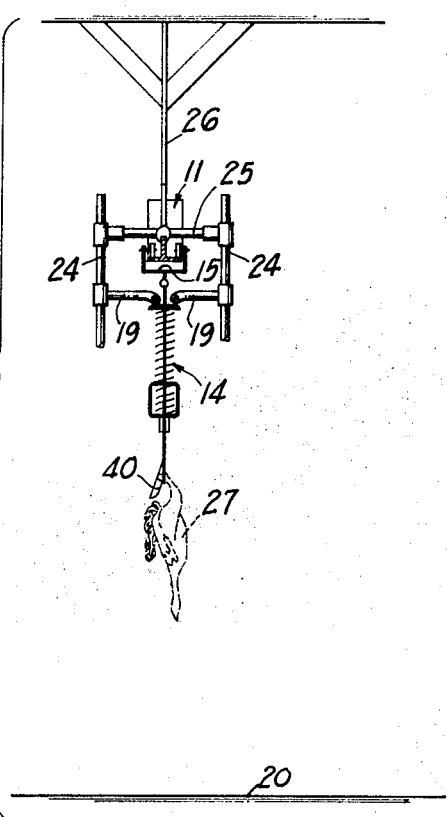
FIG. 10 is another transverse cross-sectional view, taken along the line 10—10 of FIG. 1 showing a bird supported by a shackle with the viscera suspended therefrom and the eviscerating tool fully withdrawn.

As the rollers 12 begin to follow the declining portion of the path of travel, the head of the bird 27 is loosely gripped between parallel moving portions of another pair of endless belts or chains 46 disposed within the table 18 and driven by a motor 47. The belts 46 move the head of the bird in a line angularly oriented to one side of the path of travel of the bird, in this case away from the viewer as seen in FIG. 1. At the same time, the edges of square-configured arms 31 of the shackle 14 are received between the elongated rods 22 which in turn are angularly oriented with respect to the path of travel of the bird, but to the other side thereof. Thus, as the rollers 12 proceed down the rail 11, lowering the bird-supporting shackle 14 vertically downward as it moves along the predetermined path of travel, the head of the bird 27 is moved to one side and the rear end thereof is moved to the other side, thereby rotating the bird generally about the bracket 30 of the shackle 14 wherein rod ends 32 are pivotally disposed to orient the bird with its back approaching a horizontal and downwardly-facing attitude. The forward pivotal movement of the rod support 33 is limited, as shown in FIG. 9, by the elongated rod 23 which it contacts during rotation of the bird. As the shackle is lowered, assisted by the biasing force of the spring 38, relative movement between the tool 40 and the shackle 14 causes the jawed edges of the serrations 42 on the spoon 40 to be dragged across the inside of the back of the bird to thereby tear the lungs free from their appendages and force the viscera 48 slowly upwardly and out through the precut openings in the rear thereof. The notch 41 permits the spoon 40 to cleave closely adjacent the backbone BB of the chicken or other fowl 27 as seen in FIG. 12. The bird is then carried away from the eviscerating area and from the belts 46 so that its head is no longer gripped therebetween, and it is conveyed by the system 10, suspended from a shackle 14 in a head lowermost position, with the viscera hanging over its back fully exposed, as shown in FIG. 10, to an inspector for a quick visual inspection thereof.

Preferably, in practicing the present invention, the bird 27 is killed by cutting the jugular vein near the head thereof. An operator may then be stationed between the tables 16 and 18 for administering a second cut C, this one near the shoulder of the bird to sever the esophagus or gullet G between the crop CR and head H of the fowl 27, as seen in FIG. 12. Since there is a valve V at the entry to crop CR, the material in the crop CR will be retained therein by valve V to prevent contamination of the fowl 27 as the crop is removed rearwardly out of the precut hole in the abdomen of the fowl. The tool 40 extends into the cavity of the fowl to a point just rearwardly of the crop CR and has a configuration such that it will gather and pull with it the heart HT, liver L, lungs LG, gizzard G and intestines I comprising the viscera of the fowl as it is automatically withdrawn therefrom. The esophagus or gullet and proventriculus or stomach S, connecting the crop CR and the gizzard GD is not severed in this removal operation and since crop CR is not removed by the tool 40, the gullet G and stomach S support the viscera over the back outside the fowl 27 for inspection. When the giblets, generally comprising the heart, liver and gizzard, are severed from the useable portions of the viscera, the crop CR is removed through the precut hole in the abdomen of the bird simply by grasping the gizzard and pulling before it is severed from the gullet G and stomach S. This permits retention of a greater amount of edible weight in the neck portion of the bird since the neck does not have to be severed for the purpose of removing the crop CR from the front of the bird as was previously done.

Figure 11:
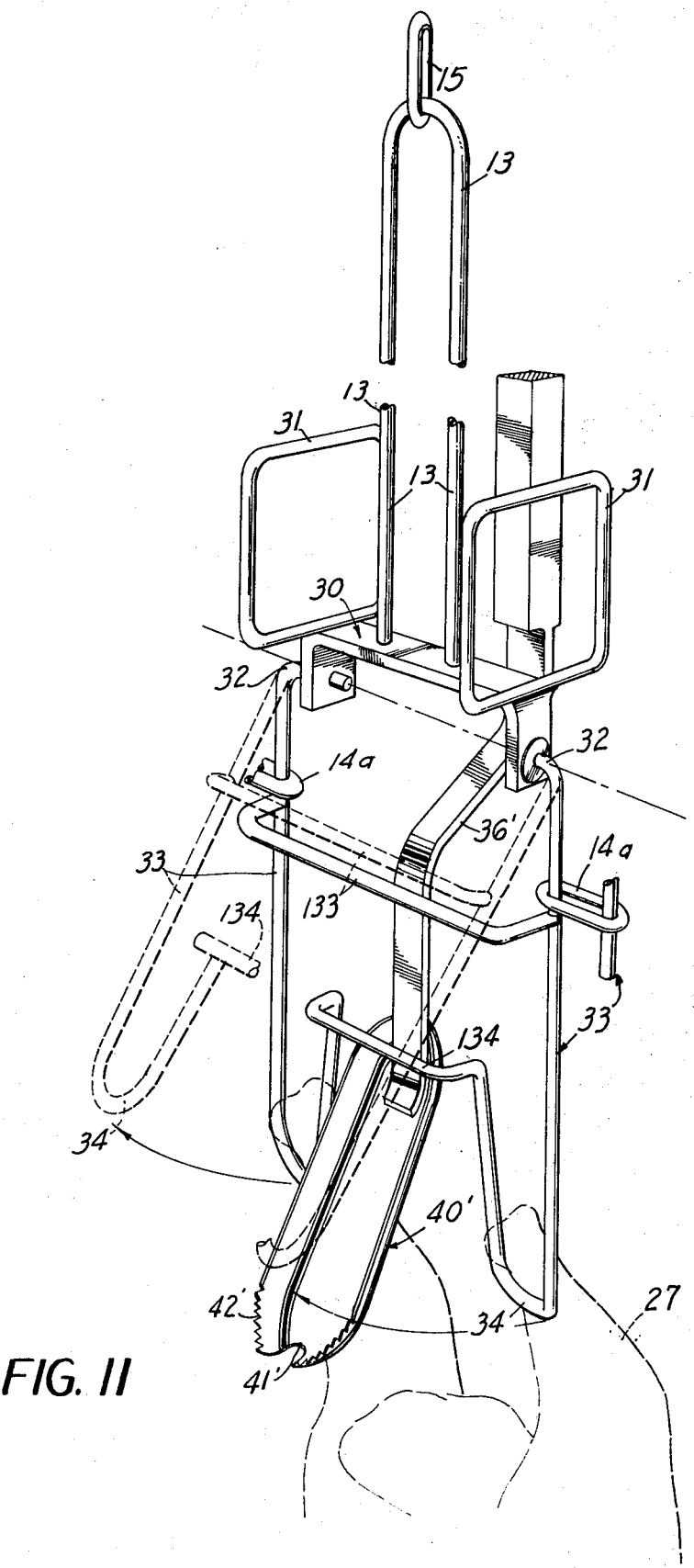
FIG. 11 is a view similar to FIG. 2 of a second embodiment of the shackle and eviscerating tool of the invention.

Referring to FIG. 11, it will be seen that the shackle 14' is separate from the eviscerating tool 40'. In this embodiment, the shackle 14' would be carried by conveyor 10 and a second conveyor (not shown) would be provided for the tool 40'. Arm 36' would be formed and the conveyor carrying the tool 40' so the tool 40' and shackle 14' would be substantially the same as shown in FIG. 2 during the eviscerating operation. The construction of this embodiment would be such that the relative movement between shackle 14' and tool 40' would be the same as that set forth hereinabove for the shackle 14 and tool 40.

Obviously, in the interest of preventing the spread of any disease, it is intended that the viscera removal tool be sterilized before each use.

Briefly stated in summary, according to the present invention, an invention, a method and an apparatus for performing such method are provided for automatically withdrawing the viscera, including the crop, from chickens or other fowl and exposing such viscera still intact with the chicken or other fowl for visual inspection thereof.

Obviously, many modifications and variations of the present invention are possible in the light of the above teachings. It is therefore to be understood that the invention may be practiced otherwise than as specifically described.

What is claimed as new and desired to be secured by Letters Patent of the United States is:

1. Apparatus for removing the viscera from a chicken or other fowl and exposing the viscera for inspection in a predetermined orientation relative to the chicken, comprising:
   means for conveying a chicken or other fowl suspended head lowermost along a predetermined path;
   a viscera removal tool associated with said conveying means and positioned above said suspended chicken or other fowl;
   means for automatically effecting relative vertical movement between said chicken or other fowl and said removal tool so as to insert said tool into the abdomen of said chicken or other fowl between the viscera and the carcass;
   means for automatically pivoting said chicken or other fowl so that said chicken or other fowl is angularly disposed relative to said predetermined path;
   and means for reversing said relative vertical movement between said tool and said chicken or other fowl to withdraw said tool and viscera while still maintaining said chicken or other fowl in said angularly disposed position so that said viscera will be exposed for inspection in said predetermined orientation.

2. Apparatus as set forth in claim 1, wherein said conveying means comprises a shackle for supporting said chicken or other fowl in a head lowermost condition.

3. Apparatus as set forth in claim 2, wherein said viscera removal tool is movably disposed on said shackle.

4. Apparatus as set forth in claim 3, further comprising a spring means biasing said removal tool to a retracted position on said shackle.

5. Apparatus as set forth in claim 1 wherein said apparatus includes means for elevating said chicken or other fowl while simultaneously maintaining said removal tool vertically stable and includes means for lowering said chicken or other fowl while maintaining said removal tool vertically stable to effect said relative vertical movement between said tool and said chicken or other fowl.

6. Apparatus as set forth in claim 5, wherein said elevating means comprises:
   an upwardly inclined rail in said predetermined path on which the shackle is transported;
   and, an elongate vertically stable bar positioned below said rail against which said tool is biased.

7. Apparatus as set forth in claim 1 wherein said chicken or other fowl is pivoted to an angularly disposed position located on one side of said predetermined path as said tool is inserted into said chicken or other fowl and is pivoted to an angularly disposed position on an opposite side of said predetermined path while said tool and viscera is being withdrawn from said chicken or other fowl.

8. Apparatus as set forth in claim 7 wherein said means for automatically pivoting said chicken or other fowl to said two angularly disposed positions relative to said predetermined path includes guide means engaging the neck portion of said chicken or other fowl to cause said chicken or other fowl to be alternately angularly disposed in said two positions.

* * * * *